United States Patent
Suzuki (10) Patent No.: US 12,360,339 B2
(45) Date of Patent: Jul. 15, 2025

(54) OPTICAL SYSTEM AND IMAGE PICKUP APPARATUS HAVING THE SAME

(71) Applicant: CANON KABUSHIKI KAISHA, Tokyo (JP)

(72) Inventor: Takumi Suzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 17/540,501

(22) Filed: Dec. 2, 2021

(65) Prior Publication Data

US 2022/0179169 A1 Jun. 9, 2022

(30) Foreign Application Priority Data

Dec. 3, 2020 (JP) .................................. 2020-200887

(51) Int. Cl.
*G02B 9/06* (2006.01)
*H04N 25/00* (2023.01)

(52) U.S. Cl.
CPC ............... *G02B 9/06* (2013.01); *H04N 25/00* (2023.01)

(58) Field of Classification Search
CPC ........ G02B 9/06; G02B 13/0045; G02B 9/64; G02B 13/006; G02B 13/16; G02B 13/18; G02B 27/005; G02B 27/64; G02B 15/73; G02B 27/646; G02B 9/00; G02B 9/04; G02B 13/00; G02B 13/04; H04N 25/00; H04N 5/225; H04N 5/232
USPC .......................... 359/794, 823, 684, 705, 739
See application file for complete search history.

(56) References Cited

U.S. PATENT DOCUMENTS

| | | | |
|---|---|---|---|
| 10,866,390 B2 | 12/2020 | Mori | |
| 2009/0323205 A1 | 12/2009 | Park | |
| 2010/0027136 A1* | 2/2010 | Ohashi | G02B 13/04 359/753 |
| 2010/0033848 A1 | 2/2010 | Hatada | |
| 2012/0194924 A1* | 8/2012 | Sakai | G02B 13/04 359/785 |
| 2014/0334015 A1 | 11/2014 | Suzuki | |

(Continued)

FOREIGN PATENT DOCUMENTS

| | | |
|---|---|---|
| JP | S62173416 A | 7/1987 |
| JP | H09218348 A | 8/1997 |

(Continued)

OTHER PUBLICATIONS

English translation of JP-6516579 (May 2019).*

*Primary Examiner* — Thomas K Pham
*Assistant Examiner* — Kuei-Jen L Edenfield
(74) *Attorney, Agent, or Firm* — Rossi, Kimms & McDowell LLP (57) ABSTRACT

An optical system includes in order from an object side to an image side: a front lens unit having a positive refractive power; and a rear lens unit including a lens having a positive refractive power, in which the front lens unit includes a lens arranged closest to the object side has a negative refractive power, an interval between the front lens unit and the rear lens unit changes for focusing, a radius of curvature of an object-side surface of the lens having the positive refractive power arranged closest to the image side a radius of curvature on an object-side surface of the lens having the positive refractive power arranged closest to the image side are appropriately set.

24 Claims, 6 Drawing Sheets

(56) References Cited

U.S. PATENT DOCUMENTS

| | | | |
|---|---|---|---|
| 2016/0011404 A1* | 1/2016 | Suzuki | G02B 27/0025 |
| | | | 359/708 |
| 2017/0075089 A1 | 3/2017 | Nagami et al. | |
| 2019/0064487 A1* | 2/2019 | Kondo | G02B 13/18 |

FOREIGN PATENT DOCUMENTS

| | | | | |
|---|---|---|---|---|
| JP | 2010039340 A | 2/2010 | | |
| JP | 2011242520 A | 12/2011 | | |
| JP | 2014055992 A | 3/2014 | | |
| JP | 2014219587 A | 11/2014 | | |
| JP | 2017009644 A | 1/2017 | | |
| JP | 2017054078 A | 3/2017 | | |
| JP | 2018054914 A | 4/2018 | | |
| JP | 2018087932 A | 6/2018 | | |
| JP | 6516579 | * | 5/2019 | G02B 13/00 |
| JP | 2019152682 A | 9/2019 | | |

* cited by examiner

OPTICAL SYSTEM AND IMAGE PICKUP APPARATUS HAVING THE SAME

BACKGROUND OF THE INVENTION

Field of the Invention

The present invention relates to an optical system and an image pickup apparatus having the same.

Description of the Related Art

As an image pickup optical system with a wide angle of view, an image pickup optical system of so-called retrofocus type is known in which an optical system having a negative refractive power in the object side and an optical system having a positive refractive power in the image side, and is used, for example, for a wide angle lens with fixed focal length.

In addition, in the digital camera and video camera, solid-state image-pickup elements such as CCD and CMOS sensors have advanced in high resolution, and high optical performance including chromatic aberration is required and miniaturization is advancing in an image-pickup lens.

In recent years, in wide angle lens systems used for image pickup apparatus, there has been a demand for a lens having a high optical performance whereas the total lens size is small.

In general, in wide angle lens apparatuses, the downsizing of the total lens length is attempted by arranging the lens having a negative refractive power arranged at the most image side. However, since an exit pupil becomes shorter and an incident angle of an off-axal beam to the image pickup element becomes larger, a shading and the like occurs due to the influence of oblique incident light characteristic in image pickup element. Also, since the height of an off-axial beam becomes higher, the deviations of the curvature of field and the distortion during focusing becomes larger. In order to solve these problems, it is necessary to optimize the lens shapes and focusing lens unit which constitute a rear lens unit.

Japanese Patent Application Laid-Open No. 2017-009644 discloses a lens apparatus consists of, in order from object side, a front lens unit having a positive refractive power and a rear lens unit composed of a single lens having a positive refractive power, in which the front lens unit moves along an optical axis direction for focusing. Since a radius of curvature of an object side surface is smaller that that of an image side surface in a lens arranged closest to the image side, and a positive refractive power is stronger with respect to the total lens system, which causes deterioration of curvature of field mainly caused by off-axial beam, it is not desirable.

Japanese Patent Application Laid-Open No. 2014-055992 discloses a lens apparatus consisting of, in order from the object side, a front lens unit having a positive refractive power and a rear lens unit having a negative refractive power composed of a single lens having a positive refractive power, in which the front lens unit moves along the optical axis direction. In a wide angle lens apparatus, the total length of the lens apparatus can be shortened by arranging a lens having a negative refractive power and arranged at the most image side. However, shortening the exit pupil causes the incident angle of off-axial beam to the image pickup element to become large, shading and the like arises by being affected by the oblique incident beam characteristic of the image pickup element, which is not preferable.

SUMMARY OF THE INVENTION

The present disclosure provides an optical system with a wide angle of view having a small size and light weight and a high optical performance which suppresses aberration variation caused by focusing and an image pickup apparatus including the optical system.

The present disclosure presents an optical system including in order from an object side to an image side: a front lens unit having a positive refractive power; and a rear lens unit including a lens having a positive refractive power, in which the front lens unit includes a lens arranged closest to the object side has a negative refractive power, an interval between the front lens unit and the rear lens unit changes for focusing, the following conditional expression is satisfied, $$0.1 < (GLR1 + GLR2)/(GLR1 - GLR2) < 10.0$$

where GLR1 represents a radius of curvature of an object-side surface of the lens having the positive refractive power arranged closest to the image side, and GLR2 represents a radius of curvature on an object-side surface of the lens having the positive refractive power arranged closest to the image side.

Further features of the present invention will become apparent from the following description of exemplary embodiments with reference to the attached drawings.

DESCRIPTION OF THE EMBODIMENTS

A preferred embodiment of the present invention will be described in detail with reference to the accompanying drawings.

FIGS. 1, 3, 5, 7, and 9 are cross sectional views of optical systems of Embodiments 1-5 of the present invention focusing at an infinite object distance (infinity).

FIGS. 2, 4, 6, 8, and 10 are aberration diagrams of optical systems of Embodiments 1-5 of the present invention focusing at infinite object distance.

The optical system of each embodiment is used for an image pickup apparatus such as digital still camera, video camera, monitoring camera, and in-vehicle camera. In the lens cross sectional views, the left side corresponds to the object side (front) and the right side corresponds to the image side (rear).

SP denotes an aperture stop. IP denotes an image plane at which an image pickup surface of a solid-state image-pickup element (photoelectric conversion device) such as CCD sensor or CMOS sensor is disposed when used as an image pickup optical system of digital still camera or video camera. When it is used as an image pickup optical system of silver-halide film camera, photosensitive surface of film surface is disposed.

In aberration diagrams, Fno denotes F-number and ω denotes half angle of view (degrees). In spherical aberration diagrams, d denotes d-line (wavelength 587.56 nm) and g denotes g-line (wavelength 435.835 nm).

In astigmatism diagrams, ΔS denotes sagittal image plane in d-line and ΔM denotes meridional image plane in d-line. Distortion diagrams are described for d-line. Chromatic aberration diagrams show chromatic aberration of magnification for g-line.

The optical system of present invention has, in order from the object side to the image side, a front lens unit having a positive refractive power and a rear lens unit including at least one lens having a positive refractive power. During focusing, the interval between the front lens unit and the rear lens unit is changed, and the following conditional expression is satisfied, $$0.1 < (GLR1+GLR2)/(GLR1-GLR2) < 10.0 \quad (1)$$

where GLR1 represents a curvature radius of the object side surface of a positive lens arranged closest to the image side and GLR2 represents a curvature radius of the image side surface of the positive lens arranged closest to the image side.

In wide angle lenses, by properly setting lens shape arranged at the most image side, the length to the exit pupil can be set long, so that the incident angle of the off-axial beam to the becomes image pickup element becomes smaller. This makes it less subject to be affected by the influence of the oblique incident beam characteristic of the image pickup element, so that the shading and the like can be reduced. In addition, it becomes possible to appropriately correct distortion and chromatic aberration of magnification which are mainly generated by off-axial beam. In addition, by moving the front lens unit in the optical axis direction during focusing, it is possible to achieve both the suppression of variation of various aberrations during focusing and the weight reduction of the entire lens system compared with the case where the entire lens unit is a focusing unit.

The conditional expression (1) defines the shape (shape factor) of the lens arranged at the most image side. By optimizing the shape, it is possible to achieve both a reduction in shading and the like by securing exit pupil and a suppression of variation of various aberrations during focusing. If the upper limit of the conditional expression (1) is not satisfied, the exit pupil becomes long because the positive refractive power of the lens arranged at the most image side becomes strong and reduction in shading and the like becomes possible. However, as the refractive power of rear lens unit becomes stronger, miniaturization of total lens length becomes advantageous, but it causes deterioration of curvature of field aberration mainly caused by off-axial beam. If the lower limit of the conditional expression (1) is not satisfied, the positive refractive power of the lens arranged at the most image side is weakened, and the exit pupil is shortened, which is not preferable.

Preferably, the numerical range of the conditional expression (1) is set as follows.

$$0.2 < (GLR1+GLR2)/(GLR1-GLR2) < 7.0 \quad (1a)$$

More preferably, the numerical range of the conditional expression (1a) is set as follows.

$$0.3 < (GLR1+GLR2)/(GLR1-GLR2) < 5.0 \quad (1b)$$

As described above, by satisfying the conditional expression (1), in a wide angle lens, an optical system with small size, light weight and high optical performance and an image pickup apparatus including the optical system can be obtained.

In each embodiment, more preferably, one or more of the following conditional expressions is satisfied.

$$0.1 < sk/LD < 0.5 \quad (2)$$

$$-5.0 < f11/f12 < 5.0 \quad (3)$$

$$0.05 < LB/LD < 0.60 \quad (4)$$

$$1.0 < f2/f < 7.0 \quad (5)$$

$$0.2 < ESinf < 2.0 \quad (6)$$

$$PD/LD < 0.45 \quad (7)$$

$$-3.0 < f11/f < 12.0 \quad (8)$$

$$0.1 < L12/L23 < 5.0 \quad (9)$$

$$-8.0 < (G2R2+G3R1)/(G2R2-G3R1) < -0.1 \quad (10)$$

$$0.1 < fGn1/f11 < 7.0 \quad (11)$$

$$0.3 < vdn/vdp < 4.5 \quad (12)$$

where sk represents a distance between an image-side lens surface of a lens arranged closest to the image side and the image plane (back focus in air), LD represents a distance from an object-side lens surface of a lens arranged closest to the object side to the image-side lens surface of the lens arranged closest to the image side on the optical axis, f11 represents a focal length of a lens system arranged in the object side of an aperture stop included in the front lens unit, f12 represents a focal length of a lens system arranged in the image side of the aperture stop included in the front lens unit, LB represents an interval between the front lens unit and the rear lens unit on the optical axis, f represents a focal length of the entire lens system, f1 represents a focal length of the front lens unit, f2 represents a focal length of the rear lens unit, and ESinf represents a focus sensitivity of the front lens unit under a state of focusing on an object at infinity. The focus sensitivity ESinf is defined as follows, $$ESinf = (1-\beta1^2) \times \beta2^2$$

where β1 and β2 represent lateral magnifications of the front lens unit and the rear lens unit, respectively, under a state of focusing on an object at infinity.

PD represents a distance from an object-side surface of a lens arranged closest to the object side to the aperture stop on the optical axis, L12 represents an interval between a lens arranged closest to the object side and the second lens counted from the object side, and L23 presents an interval between the second lens counted from the object side and the third lens counted from the object side. G2R2 represents a radius of curvature of the image side surface of the second lens counted from the object side and G3R1 represents a radius of curvature of the object side surface of the third lens counted from the object side. fGn1 represents a focal length of the most object side lens having a negative refractive power in the front lens unit. In the lens system arranged in the object side of the aperture stop included in the front lens unit, vdn represents an average value of Abbe numbers of lenses having negative refractive powers and vdp represents an average value of Abbe numbers of lenses having positive refractive powers.

Abbe number vd is defined as follows, $$vd=(Nd-1)/(NF-NC)$$

where Nd, NF and NC represent refractive indices for d-line, F-line and C-line of Fraunhofer line.

The conditional expression (2) defines a ratio of back focus to a distance on the optical axis from the object side surface of the lens arranged closest to the object side to the image side surface of the lens arranged closest to the image side. If the upper limit of the conditional expression (2) is not satisfied, the back focus sk increases, and the lens cannot be arranged near the image pickup element, which makes it difficult to improve curvature of field and chromatic aberration of magnification, resulting in deterioration of image quality, which is undesirable. If the lower limit of the conditional expression (2) is not satisfied, the back focus sk shortens and the lens can be arranged closer to the image pickup element. Therefore, it is beneficial in improvement of curvature of field and chromatic aberration of magnification, but beomes difficult to arrange shutter member and the like.

The conditional expression (3) defines a ratio of a focal length f11 of a lens system (1st sub lens unit) arranged in the object side of the aperture stop included in the front lens unit to the focal length f12 of a lens system (2nd sub lens unit) arranged in the object side of the aperture stop included in the front lens unit. If the upper limit of the conditional expression (3) is not satisfied, the refractive power of the lens system arranged in the object side of the aperture stop included in the front lens unit increases, and it is advantageous for miniaturization of lens system. However, it is not preferable because distortion and chromatic aberration of magnification generated by the off-axial beam are deteriorated. If the lower limit of the conditional expression (3) is not satisfied, the refractive power of the lens system arranged in the object side of the aperture stop included in the front lens unit weakens, which is advantageous for suppression of various aberrations, but it is not preferable because the lens diameter increases.

The conditional expression (4) defines a ratio of the interval LB on the optical axis between the front lens unit and the rear lens unit to the distance LD on optical axis from the object-side surface of the lens arranged closest to the object side to the image side surface of the lens arranged closest to the image side. If the upper limit of the conditional expression (4) is not satisfied, it is advantageous for the diameter of the lens arranged closest to the image side in the front lens unit to be decreased, but it is not preferable for the total lens length to be increased. If the lower limit of the conditional expression (4) is not satisfied, it is advantageous for the total lens length to be decreased, but it is not preferable because it becomes difficult to arrange a mechanical member necessary for changing the interval between the front lens unit and the rear lens unit.

The conditional expression (5) defines a ratio of the focal length f2 of the rear lens unit to a focal length f of the entire lens system. By optimizing the focal length of the rear lens unit, the miniaturization of the total lens length and the suppression of the variations of various aberrations during focusing can be compatible. If the upper limit of the conditional expression (5) is not satisfied, the positive refractive power of the rear lens unit is weakened, which is advantageous in suppressing of various aberrations, however leads to a larger total lens length. If the lower limit of the conditional expression (5) is not satisfied, the positive refractive power of the rear lens unit becomes stronger, which leads to downsizing of total lens length, however it is not desirable because curvature of field and spherical aberration deteriorate.

The conditional expression (6) specifies the focus sensitivity ESinf of the front lens unit when focusing on an object at infinity. If the upper limit of the conditional expression (6) is not satisfied, a change in angle of view relative to a movement amount of the focus lens unit during focusing increases, which is not preferable. In addition, it is not preferable because it becomes difficult to control spherical aberration and variation in curvature of field during focusing. If the lower limit of the conditional expression (6) is not satisfied, it becomes easier to suppress the changes in spherical aberration and curvature of field during focusing, but the amount of movement of the focus lens unit during focusing increases, which causes the enlargement of the total lens length.

The conditional expression (7) defines a position of the aperture stop in the entire lens system. By optimizing the aperture position, it is possible to downsize the lens diameter on the object side. If the upper limit of conditional expression (7) is not satisfied, it is not preferable because the miniaturization of the diameter of the lens arranged on the object side becomes difficult.

The conditional expression (8) defines a ratio of focal length f1 of the front lens unit to a focal length f of the entire lens system. By optimizing the refractive power of the front lens unit, it is possible to achieve both miniaturization of the lens system and a good optical performance. If the upper limit of the conditional expression (8), the refractive power of the front lens unit becomes stronger, which is advantageous in the downsizing of the total lens length, but causes deterioration of the field curvature aberration. If the lower limit of the conditional expression (8) is not satisfied, the refractive power of the front lens unit becomes weak, which is advantageous in suppressing occurrence of various aberrations, but it is not preferable because the miniaturization of the total lens length becomes difficult.

The conditional expression (9) defines a ratio of the interval L12 between the most object side lens and the second lens counted from the most object side to the interval L23 between the second lens counted from the most object side and the third lens counted from the most object side. If the upper limit of conditional expression (9) is not satisfied, the interval L12 between the lens arranged closest to the object side and the second lens counted from object side becomes longer, which leads that an off-axial marginal beam passing the lens arranged at the most object side becomes higher and leads to an enlargement of the lens diameter, which is not preferable. If the lower limit of the conditional expression (9) is not satisfied, the interval L23 between the second lens counted from the most object side and the third lens counted from the most object side becomes longer, and the height of the axial marginal beam passing through the third lens counted from the object side becomes higher, which is advantageous for the correction of spherical aberration but is not preferable because the lens diameter becomes larger.

The conditional expression (10) defines a shape of air lens (shape factor) between the image-side surface of the second lens counted from the most object side and the object-side surface of the third lens counted from the most object side. By optimizing the shape, good optical performance can be achieved mainly within the front lens unit. If the upper limit of the conditional expression (10) is not satisfied, the refractive power of the air lens is weakened, which is advantageous in suppressing the occurrence of various aberrations, but is undesirable. If the lower limit of the conditional expression (10) is not satisfied, the refractive power of the air lens is strengthened, which is advantageous for miniaturization of the total lens length, but off-axial beam is greatly diverge to cause deterioration of chromatic aberration.

The conditional expression (11) defines a ratio of a focal length fGn1 of a lens having a negative refractive power and arranged closest to the object side included in the front lens unit to a focal length f of the entire lens system. By optimizing the focal length of the lens having a negative refractive power arranged closest to the object side included in the front lens unit, miniaturization of lens diameter and good optical performance can be compatible. If the upper limit of the conditional expression (11) is not satisfied, the refractive power of the lens having a negative refractive power arranged closest to the object side included in the front lens unit weakens, which is advantageous in suppressing the occurrence of various aberrations, but is undesirable because lens diameter increases. If the lower limit of the conditional expression (11) is not satisfied, the refractive power of the most object side lens having a negative refractive power included in the front lens unit becomes stronger, which is advantageous for downsizing of the lens diameter, but is undesirable because of the deterioration of chromatic aberration.

The conditional expression (12) defines a ratio of the average value vdn of Abbe numbers of lenses having negative refractive powers included in the front lens unit to the average value vdp of Abbe numbers of lenses having positive refractive powers included in the front lens unit. By optimizing Abbe numbers of the lenses included in the front lens unit, downsizing of the lens diameter and suppression of chromatic aberration of magnification occurring in the front lens unit can be compatible. If the upper limit of the conditional expression (12) is not satisfied, correction effect of chromatic aberration of magnification increases, but it causes deterioration of axial chromatic aberration and it becomes difficult to rationalize the refractive power of lenses having negative refractive power, which leads to an enlargement of the lens diameter.

If the lower limit of the conditional expression (12) is not satisfied, the refractive power of the lens having a negative refractive power can be optimized, and the lens diameter can be downsized, but which is not preferable because it becomes difficult to appropriately correct chromatic aberration of magnification.

Preferably, the numerical ranges of the conditional expressions (2) to (12) are set as follows.

$$0.15 < sk/LD < 0.40 \tag{2a}$$

$$-3.0 < f11/f12 < 4.5 \tag{3a}$$

$$0.08 < LB/LD < 0.30 \tag{4a}$$

$$2.2 < f2/f < 6.2 \tag{5a}$$

$$0.4 < ESinf < 1.0 \tag{6a}$$

$$PD/LD < 0.4 \tag{7a}$$

$$-2.6 < f11/f < 10.0 \tag{8a}$$

$$0.3 < L12/L23 < 4.0 \tag{9a}$$

$$-4.0 < (G2R2+G3R1)/(G2R2-G3R1) < -0.3 \tag{10a}$$

$$0.3 < fGn1/f1 < 4.0 \tag{11a}$$

$$0.8 < vdn/vdp < 3.2 \tag{12a}$$

More preferably, the numerical ranges of the conditional expressions (2a) to (12a) are set as follows.

$$0.2 < sk/LD < 0.36 \tag{2b}$$

$$-1.5 < f11/f12 < 4.0 \tag{3b}$$

$$0.10 < LB/LD < 0.20 \tag{4b}$$

$$3.4 < f2/f < 5.5 \tag{5b}$$

$$0.5 < ESinf < 0.82 \tag{6b}$$

$$PD/LD < 0.35 \tag{7b}$$

$$-2.2 < f11/f < 9.0 \tag{8b}$$

$$0.9 < L12/L23 < 3.0 \tag{9b}$$

$$-2.7 < (G2R2+G3R1)/(G2R2-G3R1) < -1.1 \tag{10b}$$

$$0.5 < fGn1/f1 < 2.1 \tag{11b}$$

$$1.1 < vdn/vdp < 2.6 \tag{12b}$$

When the focusing unit moves from a state of focusing on an object at infinity to a state of focusing on a closest object distance, it is desirable that the rear lens unit be fixed. Furthermore, it is desirable to have only one focusing lens unit. This makes it possible to reduce the weight of the focusing unit because components, such as the motor required to move the focusing lens unit, can be reduced.

Preferably, the front lens unit has an only one lens having a positive refractive power included in lens system arranged in the object side of the aperture stop in the front lens unit. This makes it possible to achieve both the correction of chromatic aberration of magnification generated in the front lens unit and the downsizing of the total lens length.

In the front lens unit, it is desirable that the at least one lens having a positive refractive power included in the lens system arranged in the object side of the aperture stop in the front lens unit, has an image side surface which is convex toward the image side on image side. This makes it possible to achieve both the correction of spherical aberration and the downsizing of the total lens length.

Preferably, the front lens unit has at least one cemented lens constituted by a lens having a refractive power and a lens having a negative refractive power. It is preferable to have two cemented lenses each of which is constituted by a lens having a positive refractive power and a lens having a negative refractive power. This makes it possible to correct both axial chromatic aberration and chromatic aberration of magnification.

The front lens unit preferably has at least one aspherical surface lens. This makes it possible to properly correct variation in curvature of field due to focusing mainly caused by off-axial beam.

Preferably, the rear lens unit is composed of a single lens having a positive refractive power. This makes it possible to secure exit pupil and to reduce the weight of the lens.

When an image stabilization lens unit is moved to a direction perpendicular to the optical axis to correct an image stabilization, some lenses in the entire lens system may have a moving mechanism (image stabilizing mechanism).

EMBODIMENT

Hereinafter, Numerical Embodiments 1 to 5 will be referred to as the embodiment.

In each Numerical Embodiment, ri represents a radius of curvature of the i-th surface counted from the object side, di represents lens thickness or air interval between i-th surface and i+1-th surface counted from the object side, ndi and vdi represent refractive index and Abbe number of an optical medium between i-th surface and i+1-th surface counted, respectively, counted from the object side.

The aspherical surface shape is expressed by the following equation, $$X = \frac{\frac{H^2}{R}}{1+\sqrt{1-(1+K)\left(\frac{H}{R}\right)^2}} + A4H^4 + A6H^6 + A8H^8 + A10H^{10} + A12H^{12} + A14H^{14}$$

where X axis corresponds to the optical axis direction, H axis corresponds to a direction perpendicular to the optical axis, a light traveling direction is a positive direction, R represents a paraxial radius of curvature, K represents a conic constant, A4, A6, A8, A10, A12, and A14 represent aspherical surface coefficient, respectively.

The mark * to the right of surface number means that the surface is a surface having an aspherical surface shape. "e-X" means "×10$^{-X}$". BF stands for back focus.

Next, an embodiment of a digital still camera equipped with the optical system of the present invention as an image pickup optical system will be described with reference to FIG. 11.

Figure 1:
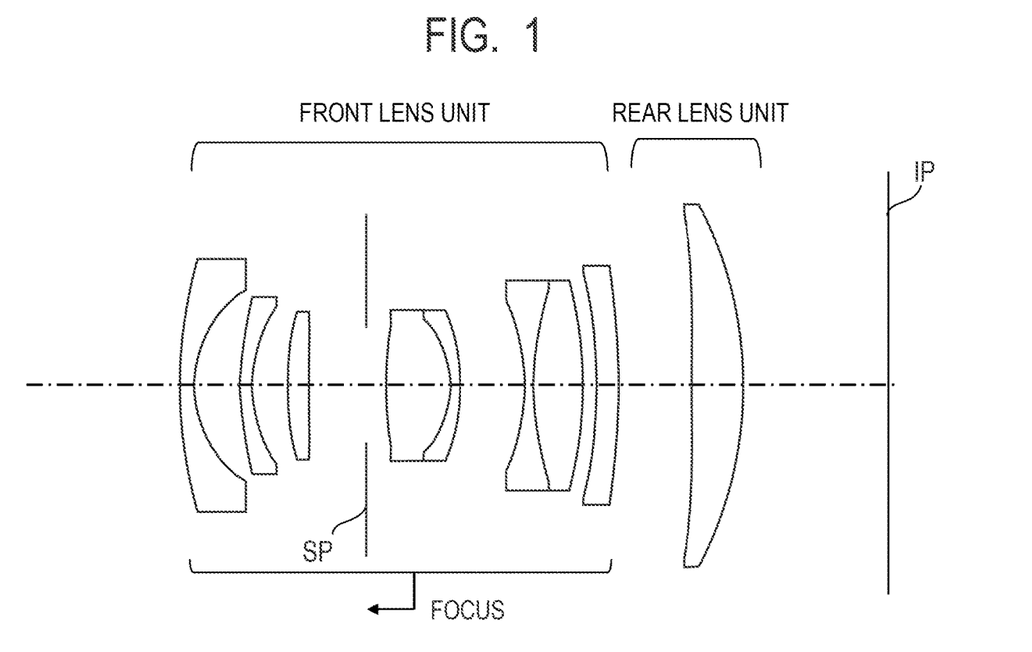
FIG. 1 is a lens cross sectional view of Embodiment 1 at focusing at infinity.
Figure 2:
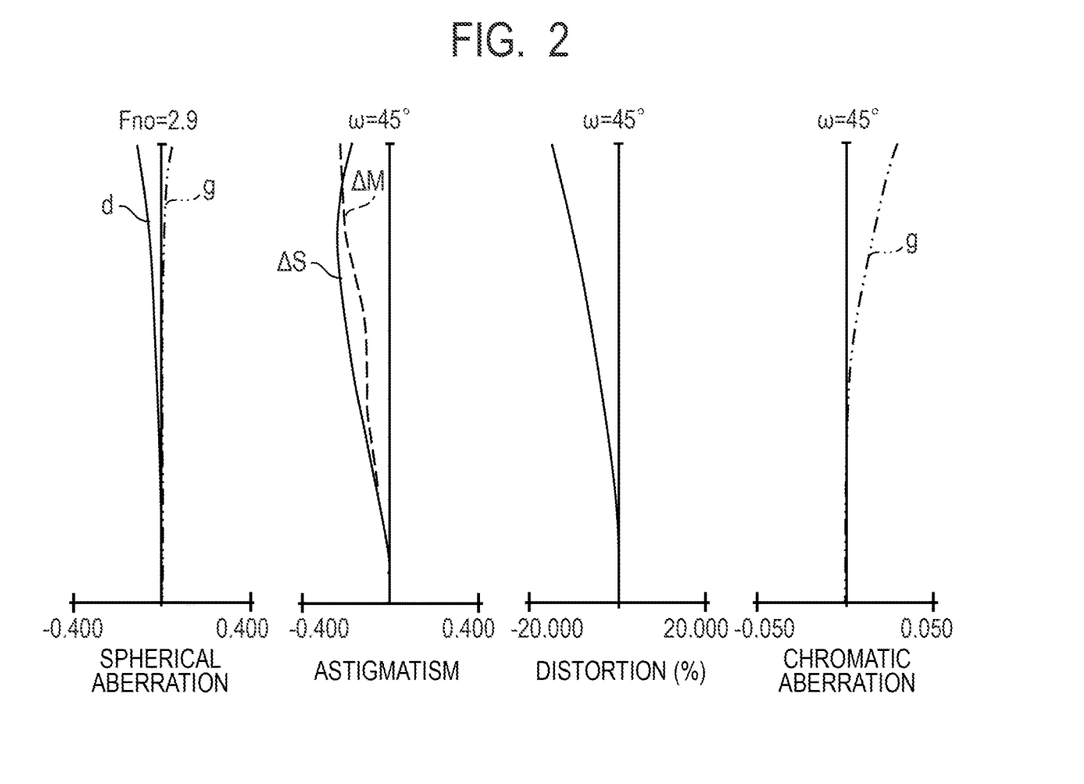
FIG. 2 shows aberration diagram of Embodiment 1 focusing at infinity.
Figure 3:
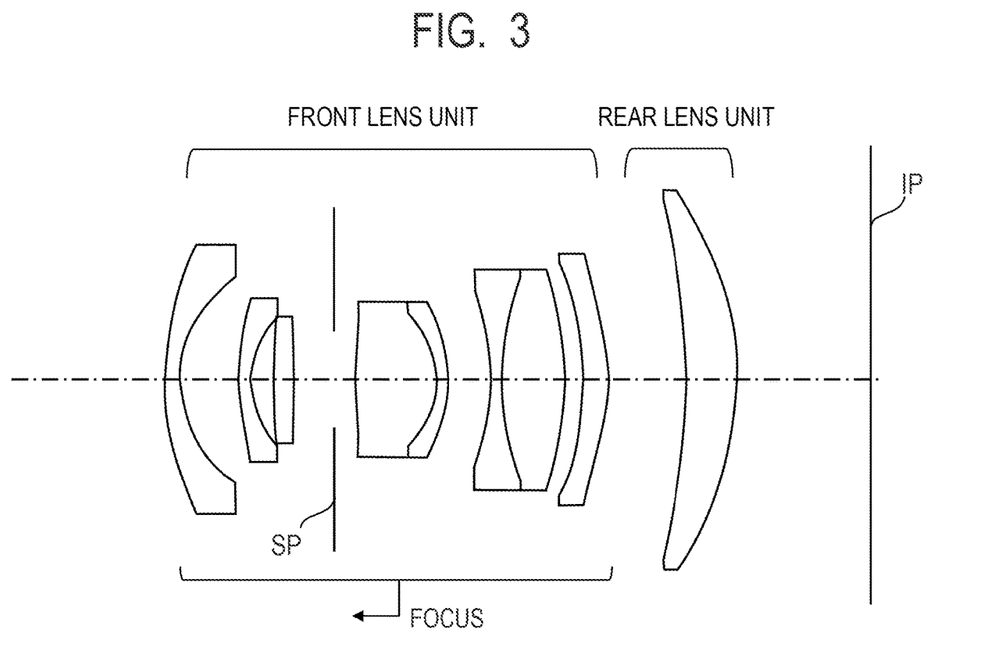
FIG. 3 is a lens cross sectional view of Embodiment 2 focusing at infinity.
Figure 4:
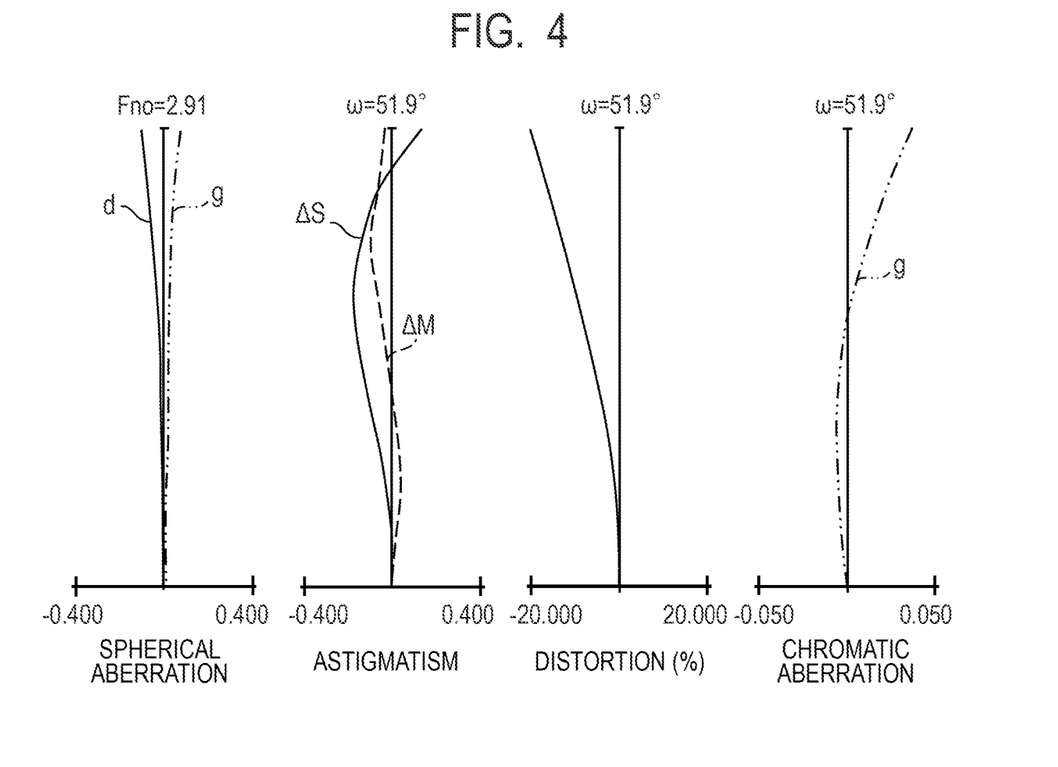
FIG. 4 shows aberration diagram of Embodiment 2 focusing at infinity.
Figure 5:
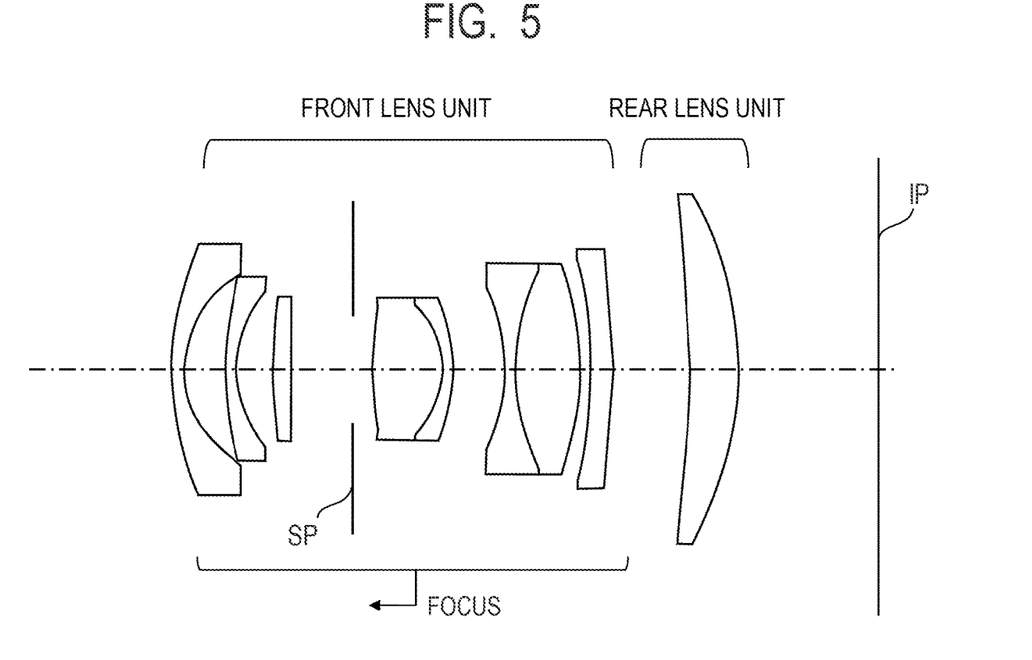
FIG. 5 is a lens cross sectional view of Embodiment 3 focusing at infinity.
Figure 6:
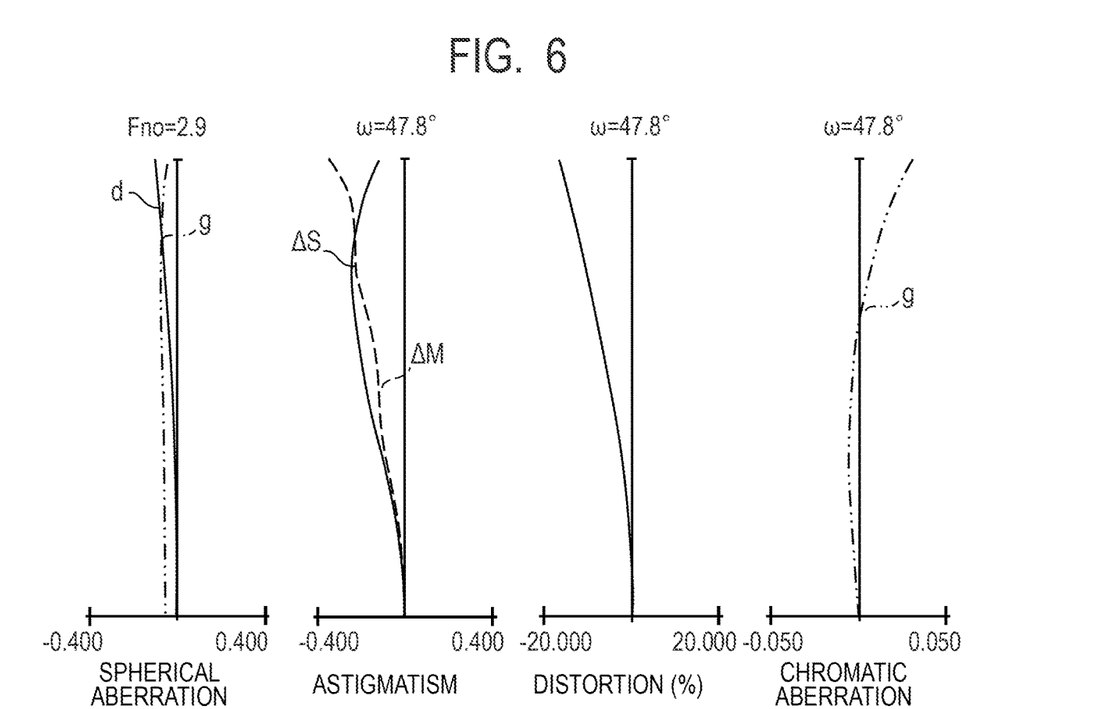
FIG. 6 shows aberration diagram of Embodiment 3 focusing at infinity.
Figure 7:
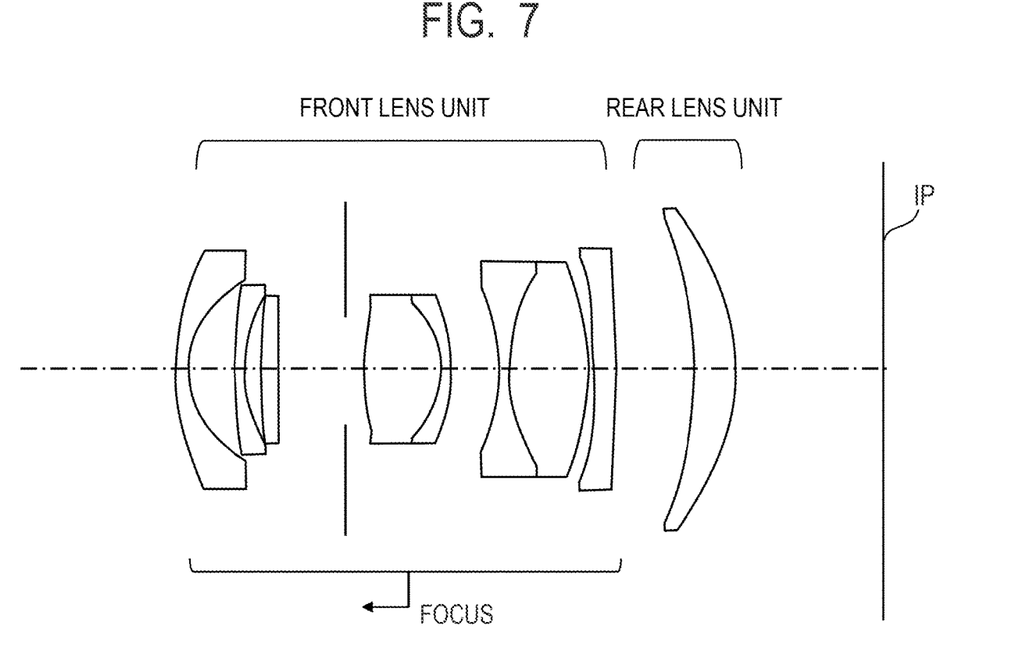
FIG. 7 is a lens cross sectional view of Embodiment 4 focusing at infinity.
Figure 8:
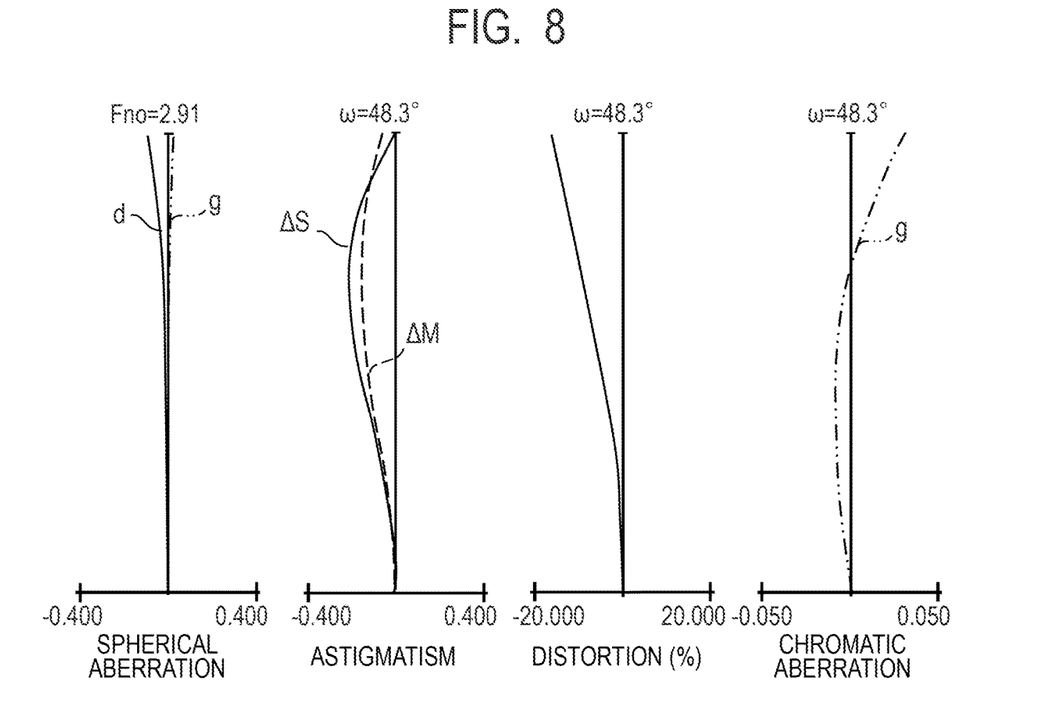
FIG. 8 shows aberration diagram of Embodiment 4 focusing at infinity.
Figure 9:
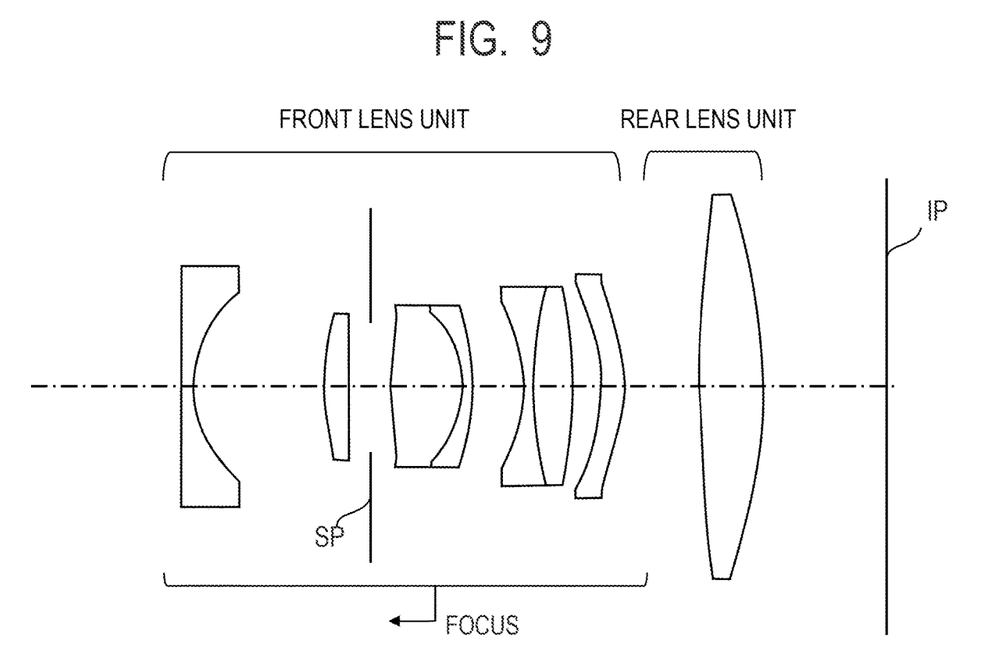
FIG. 9 is a lens cross sectional view of Embodiment 5 focusing at infinity.
Figure 10:
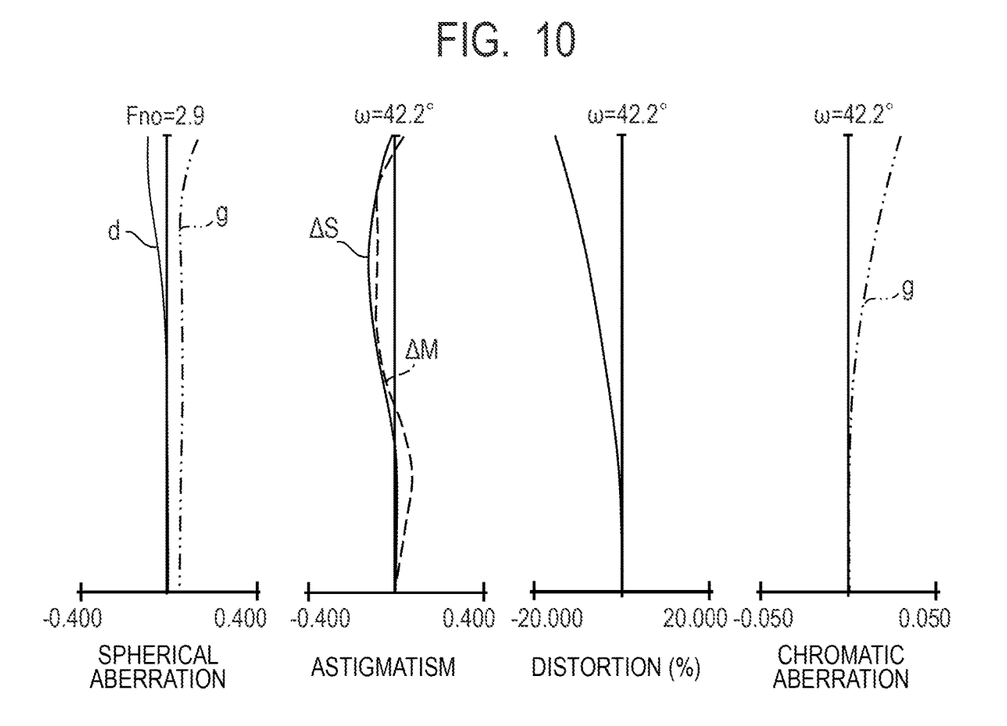
FIG. 10 shows aberration diagram of Embodiment 5 focusing at infinity.
Figure 11:
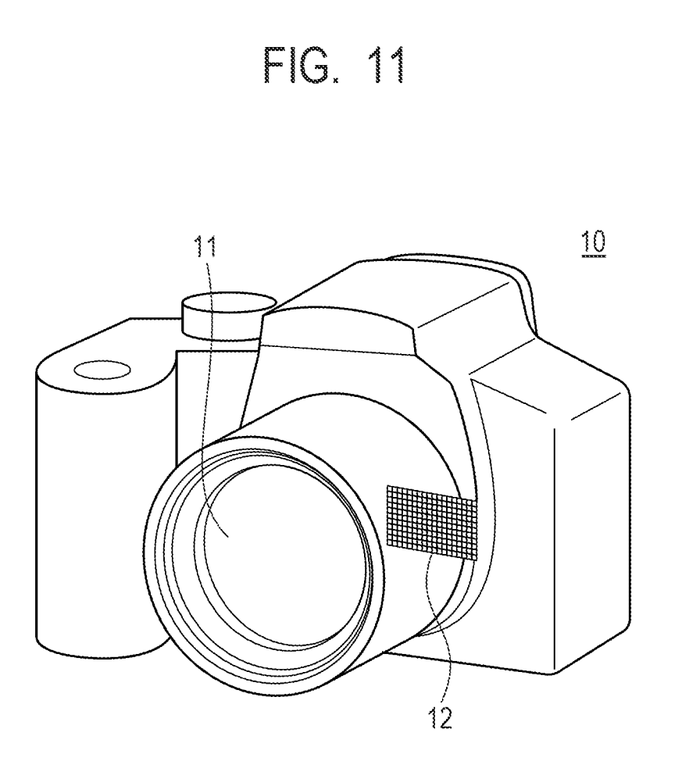
FIG. 11 is a schematic representation of a main portion of image pickup apparatus of the present invention.

In FIG. 11, reference numeral 10 denotes a camera body, and reference numeral 11 denotes an image pickup optical system constituted by a lens apparatus according to any one of Embodiments 1-5. Reference numeral 12 denotes a solid-state image-pickup element (photoelectric conversion device) such as a CCD sensor, a CMOS sensor and the like which is incorporated in an camera body, receives an object image formed by an image pickup optical system 11.

Numerical Embodiment 1

| Unit mm | | | | |
|---|---|---|---|---|
| Surface Data | | | | |
| Surface number | r | d | nd | vd |
| 1 | 41.307 | 1.20 | 1.60311 | 60.6 |
| 2 | 9.978 | 4.26 | | |
| 3 | 30.342 | 1.00 | 1.48749 | 70.2 |
| 4 | 12.124 | 3.17 | | |
| 5 | 28.492 | 2.01 | 1.83481 | 42.7 |
| 6 | −662.034 | 5.01 | | |
| 7 (Aperture stop) | ∞ | 1.80 | | |
| 8 | 47.613 | 5.77 | 1.81600 | 46.6 |
| 9 | −8.980 | 0.91 | 1.90366 | 31.3 |
| 10 | −16.902 | 5.69 | | |
| 11 | −18.534 | 0.92 | 1.69895 | 30.1 |
| 12 | 29.517 | 4.40 | 1.59282 | 68.6 |
| 13 | −35.692 | 1.10 | | |
| 14* | −54.759 | 2.10 | 1.53110 | 55.9 |
| 15* | −34.782 | 6.57 | | |
| 16 | −161.374 | 4.59 | 1.60311 | 60.6 |
| 17 | −34.257 | 12.94 | | |
| Image plane | ∞ | | | |

| Aspherical Surface Data |
|---|
| Fourteenth surface |
| K = 0.00000e+000 A4= 4.57136e−005 A6 = −1.97209e−006 A8 = 3.74538e−008 A10 = −4.12263e−010 A12 = 1.59769e−012 |
| Fifteenth surface |
| K = 0.00000e+000 A4 = 1.03365e−004 A6 = −1.10800e−006 A8 = 1.95771e−008 A10 = −1.88559e−010 A12 = 6.52817e−013 |

| Various Data | |
|---|---|
| Focal length | 18.20 |
| F-number | 2.90 |
| Half angle of view | 45.00 |
| Image height | 18.20 |
| Total lens length | 63.45 |
| BF | 12.94 |

| Lens Unit Data | | |
|---|---|---|
| Unit | Leading surface | Focal length |
| 1 | 1 | 21.96 |
| 2 | 16 | 71.14 |

Numerical Embodiment 2

| Unit mm | | | | |
|---|---|---|---|---|
| Surface Data | | | | |
| Surface number | r | d | nd | vd |
| 1 | 25.173 | 1.20 | 1.59522 | 67.7 |
| 2 | 9.960 | 4.83 | | |
| 3 | 22.509 | 1.00 | 1.49700 | 81.5 |
| 4 | 7.529 | 1.81 | | |
| 5 | 57.731 | 1.65 | 1.91650 | 31.6 |
| 6 | −98.374 | 3.25 | | |
| 7 (Aperture stop) | ∞ | 1.80 | | |
| 8 | 64.342 | 6.53 | 1.88300 | 40.8 |
| 9 | −7.326 | 0.91 | 2.00069 | 25.5 |
| 10 | −12.387 | 3.52 | | |
| 11 | −19.745 | 0.92 | 1.69895 | 30.1 |
| 12 | 23.747 | 5.10 | 1.49700 | 81.5 |
| 13 | −27.013 | 1.44 | | |
| 14* | −29.866 | 2.10 | 1.53110 | 55.9 |
| 15* | −17.802 | 6.34 | | |
| 16 | −62.773 | 4.14 | 1.64000 | 60.1 |
| 17 | −26.587 | 10.97 | | |
| Image plane | ∞ | | | |

-continued

Unit mm

Aspherical Surface Data

Fourteenth surface
K = 0.00000e+000 A4= −2.738441e−005 A6 = −3.88135−007
A8 = 2.67267e−008 A10 = −4.37155e−010 A12 = 2.30061e−012
A14 = −5.75662e−015
Fifteenth surface
K = 0.00000e+000 A4 = 7.95764e−005 A6 = −3.58079e−007
A8 = 2.89945e−008 A10 = −3.41257e−010 A12 = 1.23584e−012
A14 = −2.30241e−016

Various Data

| | |
|---|---|
| Focal length | 14.28 |
| F-number | 2.91 |
| Half angle of view | 51.88 |
| Image height | 18.20 |
| Total lens length | 57.50 |
| BF | 10.97 |

Lens Unit Data

| Unit | Leading surface | Focal length |
|---|---|---|
| 1 | 1 | 16.48 |
| 2 | 16 | 68.99 |

Numerical Embodiment 3

Unit mm

Surface Data

| Surface number | r | d | nd | vd |
|---|---|---|---|---|
| 1* | 27.125 | 1.10 | 1.60311 | 60.6 |
| 2 | 9.735 | 3.67 | | |
| 3 | 30.493 | 1.00 | 1.48749 | 70.2 |
| 4 | 10.586 | 3.21 | | |
| 5 | 40.191 | 1.71 | 1.83400 | 37.2 |
| 6 | −392.360 | 5.43 | | |
| 7 (Aperture stop) | ∞ | 1.80 | | |
| 8 | 38.857 | 6.25 | 1.83481 | 42.7 |
| 9 | −8.128 | 0.90 | 1.90366 | 31.3 |
| 10 | −16.045 | 4.69 | | |
| 11 | −16.526 | 0.92 | 1.68893 | 31.1 |
| 12 | 19.781 | 5.80 | 1.59282 | 68.6 |
| 13 | −26.412 | 0.91 | | |
| 14* | −50.009 | 2.10 | 1.53110 | 55.9 |
| 15* | −32.615 | 6.74 | | |
| 16 | −109.118 | 4.42 | 1.62299 | 58.2 |
| 17 | −31.658 | 12.54 | | |
| Image plane | ∞ | | | |

Aspherical Surface Data

Fourteenth surface
K = 0.00000e+000 A4= 5.22756e−005 A6 = −1.92650e−006
A8 = 3.51677e−008 A10 = −3.71946e−010 A12 = 1.36387e−012
Fifteenth surface
K = 0.00000e+000 A4 = 1.10438e−004 A6 = −1.14287e−006
A8 = 2.01498e−008 A10 = −1.88642e−010 A12 = 6.28660e−013

Various Data

| | |
|---|---|
| Focal length | 16.48 |
| F-number | 2.90 |
| Half angle of view | 47.84 |
| Image height | 18.20 |
| Total lens length | 63.19 |
| BF | 12.54 |

Lens Unit Data

| Unit | Leading surface | Focal length |
|---|---|---|
| 1 | 1 | 19.70 |
| 2 | 16 | 70.05 |

Numerical Embodiment 4

Unit mm

Surface Data

| Surface number | r | d | nd | vd |
|---|---|---|---|---|
| 1* | 23.402 | 1.20 | 1.65160 | 58.5 |
| 2 | 9.036 | 4.12 | | |
| 3 | 42.789 | 0.90 | 1.49700 | 81.5 |
| 4 | 13.075 | 1.50 | | |
| 5 | 53.278 | 1.58 | 1.91082 | 35.3 |
| 6 | −3366.466 | 6.15 | | |
| 7 (Aperture stop) | ∞ | 1.66 | | |
| 8 | 30.996 | 6.92 | 1.83481 | 42.7 |
| 9 | −8.459 | 0.87 | 1.90366 | 31.3 |
| 10 | −16.835 | 4.39 | | |
| 11 | −17.793 | 0.93 | 1.68893 | 31.3 |
| 12 | 17.113 | 7.09 | 1.61800 | 63.4 |
| 13 | −24.767 | 0.50 | | |
| 14* | −88.687 | 2.10 | 1.53110 | 55.9 |
| 15* | −49.891 | 6.99 | | |
| 16 | −37.109 | 3.65 | 1.60311 | 60.6 |
| 17 | −22.451 | 13.47 | | |
| Image plane | ∞ | | | |

Aspherical Surface Data

Fourteenth surface
K = 0.00000e+000 A4= 3.20994e−005 A6 = −1.17847e−006
A8 = 5.68853e−009 A10 = −3.19562e−011 A12 = 1.12210e−014
Fifteenth surface
K = 0.00000e+000 A4 = 1.04857e−004 A6 = −6.86726e−007
A8 = 1.82918e−009

Various Data

| | |
|---|---|
| Focal length | 16.48 |
| F-number | 2.91 |
| Half angle of view | 48.31 |
| Image height | 18.50 |
| Total lens length | 64.04 |
| BF | 13.47 |

Lens Unit Data

| Unit | Leading surface | Focal length |
|---|---|---|
| 1 | 1 | 18.71 |
| 2 | 16 | 86.17 |

Numerical Embodiment 5

Unit mm

Surface Data

| Surface number | r | d | nd | vd |
|---|---|---|---|---|
| 1 | 370.091 | 1.20 | 1.65160 | 58.5 |
| 2 | 10.962 | 11.82 | | |
| 3 | 23.532 | 2.35 | 1.81600 | 46.6 |
| 4 | −261.263 | 1.97 | | |
| 5 (Aperture stop) | ∞ | 1.80 | | |
| 6 | 55.000 | 6.46 | 1.81600 | 46.6 |
| 7 | −9.617 | 0.91 | 1.90366 | 31.3 |
| 8 | −22.024 | 4.64 | | |
| 9 | −15.178 | 0.92 | 1.69895 | 30.1 |
| 10 | 37.405 | 3.54 | 1.59282 | 68.6 |
| 11 | −45.470 | 2.59 | | |
| 12* | −18.407 | 2.10 | 1.53110 | 55.9 |
| 13* | −15.903 | 6.80 | | |
| 14 | 111.462 | 5.73 | 1.51633 | 64.1 |
| 15 | −53.364 | 11.16 | | |
| Image plane | ∞ | | | |

Aspherical Surface Data

Twelfth surface
K = 0.00000e+000 A4= −4.23116e−005 A6 = −3.29069e−007
A8 = 3.49757e−008 A10 = −2.97301e−010
A12 = 7.14062e−013 A14 = −9.39720e016

Thirteenth surface
K = 0.00000e+000 A4 = 5.00081e−005 A6 = −5.09273e−007
A8 = 3.35843e−008 A10 = −2.22271e−010
A12 = 2.03270e−013 A14 = 1.10164e−015

Various Data

| | |
|---|---|
| Focal length | 20.10 |
| F-number | 2.90 |
| Half angle of view | 42.16 |
| Image height | 18.20 |
| Total lens length | 63.99 |
| BF | 11.16 |

Lens Unit Data

| Unit | Leading surface | Focal length |
|---|---|---|
| 1 | 1 | 24.37 |
| 2 | 14 | 70.73 |

Although preferred embodiments of the present invention have been described above, the present invention is not limited to these embodiments, and various range and modifications can be made within deformation in the spirit and scope thereof.

TABLE 1

| Conditional Expression | Numerical Embodiment 1 | 2 | 3 | 4 | 5 |
|---|---|---|---|---|---|
| (1) (GLR1+ GLR2)/(GLR1 − GLR2) | 1.54 | 2.47 | 1.82 | 4.06 | 0.35 |
| (2) sk/LD | 0.26 | 0.24 | 0.25 | 0.27 | 0.21 |
| (3) f11/f12 | −1.41 | −1.11 | −1.17 | −1.02 | 3.62 |
| (4) LB/LD | 0.13 | 0.14 | 0.13 | 0.14 | 0.13 |
| (5) f2/f | 3.91 | 4.83 | 4.25 | 5.23 | 3.52 |
| (6) ESinf | 0.69 | 0.75 | 0.70 | 0.78 | 0.68 |
| (7) PD/LD | 0.33 | 0.30 | 0.32 | 0.31 | 0.33 |
| (8) f1/f | −1.80 | −1.34 | −1.45 | −1.17 | 8.46 |
| (9) L12/L23 | 1.35 | 2.67 | 1.14 | 2.75 | — |
| (10) (G2R2 + G3R1)/(G2R2 − G3R1) | −2.48 | −1.30 | −1.72 | −1.65 | — |
| (11) fGn1/f1 | 0.68 | 1.50 | 1.08 | 1.21 | — |

TABLE 1-continued

| Conditional Expression | Numerical Embodiment 1 | 2 | 3 | 4 | 5 |
|---|---|---|---|---|---|
| (12) vdn/vdp | 1.53 | 2.36 | 1.76 | 1.99 | 1.26 |
| PD | 16.65 | 13.74 | 16.13 | 15.46 | 17.33 |
| LD | 50.51 | 46.53 | 50.65 | 50.57 | 52.82 |
| LB | 6.57 | 6.34 | 6.74 | 6.99 | 6.80 |
| sk | 12.94 | 10.97 | 12.54 | 13.47 | 11.16 |
| f11 | −32.77 | −19.07 | −23.97 | −19.35 | 170.02 |
| f12 | 23.16 | 17.25 | 20.55 | 19.02 | 46.95 |
| f2 | 71.14 | 68.99 | 70.05 | 86.17 | 70.73 |
| f | 18.20 | 14.28 | 16.48 | 16.48 | 20.10 |
| L12 | 4.26 | 4.83 | 3.67 | 4.12 | 11.82 |
| L23 | 3.17 | 1.81 | 3.21 | 1.50 | 1.97 |
| G2R1 | 30.34 | 22.51 | 30.49 | 42.79 | 23.53 |
| G2R2 | 12.12 | 7.53 | 10.59 | 13.08 | −261.26 |
| G3R1 | 28.49 | 57.73 | 40.19 | 53.28 | 55.00 |
| GLR1 | −161.37 | −62.77 | −109.12 | −37.11 | 111.46 |
| GLR2 | −34.26 | −26.59 | −31.66 | −22.45 | −53.36 |
| fGn1 | −22.13 | −28.53 | −25.79 | −23.36 | −17.36 |
| vdn | 65.44 | 74.64 | 65.44 | 70.05 | 58.55 |
| vdp | 42.74 | 31.60 | 37.16 | 35.25 | 46.62 |
| ESinf | 0.69 | 0.75 | 0.70 | 0.78 | 0.68 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-200887, filed Dec. 3, 2020, which is hereby incorporated by reference herein in its entirety.

What is claimed is:

1. An optical system comprising:
a plurality of lens units consisting of, in order from an object side to an image side:
a front lens unit having a positive refractive power; and
a rear lens unit including a final lens having a positive refractive power,
wherein the front lens unit includes, in order from the object side to the image side:
a first lens having a negative refractive power;
an aperture stop;
a first cemented lens consisting of a lens A and a lens B that are cemented together, one lens among the lenses A and B is a positive lens, and the other lens among the lenses A and B is a negative lens;
a second cemented lens consisting of a lens C and a lens D that are cemented together, one lens among the lenses C and D is a positive lens, and the other lens among the lenses C and D is a negative lens;
wherein the first lens is disposed at a most object side in the optical system and the final lens is disposed at a most image side in the optical system,
wherein the front lens unit is integrally moved toward the object side for focusing from an infinity to a closest object distance and the rear lens unit is not moved for focusing,
wherein the following inequality is satisfied:

$$1.54 \leq (GLR1+GLR2)/(GLR1-GLR2) \leq 2.47,$$

where GLR1 represents a radius of curvature of an object-side surface of the final lens, and GLR2 represents a radius of curvature on an image-side surface of the final lens.

2. The optical system according to claim 1, wherein the following inequality is satisfied:

$$0.1 < sk/LD < 0.5$$

where, in a state of focusing at infinity, sk represents a distance between the image-side lens surface of the final lens and an image plane, which corresponds to a back focus in air, and LD represents a distance on an optical axis between an object-side lens surface of the first lens and the image-side lens surface of the final lens.

3. The optical system according to claim 1, wherein:
the front lens unit includes:
a first lens subunit, which includes the first lens, disposed in an object side of the aperture stop; and
a second lens subunit, which includes the first cemented lens and the second cemented lens, disposed in an image side of the aperture stop, and
the following inequality is satisfied:

$$-5.0 < f11/f12 < 5.0,$$

where f11 represents a focal length of the first lens subunit and f12 represent a focal length of the second lens subunit.

4. The optical system according to claim 1, wherein the following inequality is satisfied:

$$0.05 < LB/LD < 0.60,$$

where, in a state of focusing at infinity, LB represents an interval on an optical axis between the front lens unit and the rear lens unit, and LD represents a distance on the optical axis between an object-side lens surface of the first lens and the image-side lens surface of the final lens.

5. The optical system according to claim 1, wherein the following inequality is satisfied:

$$1.0 < f2/f < 7.0,$$

where f2 represents a focal length of the rear lens unit and f represents a focal length of the optical system.

6. The optical system according to claim 1, wherein the following inequality is satisfied:

$$0.2 < ESinf < 2.0,$$

where ESinf represents a focus sensitivity of the front lens unit in a state of focusing at infinity.

7. The optical system according to claim 1, wherein the following inequality is satisfied:

$$PD/LD < 0.45,$$

where, in a state of focusing at infinity, PD represents a distance on an optical axis from an object-side surface of the first lens to the aperture stop, and LD represents a distance on the optical axis between the object-side lens surface of the first lens and the image-side lens surface of the final lens.

8. The optical system according to claim 7, wherein the following inequality is satisfied:

$$PD/LD < 0.35.$$

9. The optical system according to claim 1, wherein:
the front lens unit includes a first lens subunit, which includes the first lens, disposed in an object side of the aperture stop, and
the following inequality is satisfied:

$$-3.0 < f11/f < 12.0,$$

where f represents a focal length of the optical system and f11 represents a focal length of the first lens subunit.

10. The optical system according to claim 1, wherein:
the front lens unit includes a first lens subunit, which includes the first lens, disposed in an object side of the aperture stop, and
the first lens subunit includes three lenses.

11. The optical system according to claim 1, wherein:
the front lens unit includes a first lens subunit, which includes the first lens, disposed in an object side of the aperture stop, and
the first lens subunit includes a lens having a positive refractive power.

12. The optical system according to claim 1, wherein:
the front lens unit includes:
a second lens disposed on an image side of and adjacent to the first lens; and
a third lens disposed on an image side of and adjacent to the second lens, and
the following inequality is satisfied:

$$0.1 < L12/L23 < 5.0,$$

where L12 represents an interval between the first lens and the second lens, and L23 represents an interval between the second lens and the third lens.

13. The optical system according to claim 1, wherein:
the front lens unit includes:
a second lens disposed on an image side of and adjacent to the first lens; and
a third lens disposed on an image side of and adjacent to the second lens, the following inequality is satisfied:

$$-8.0 < (G2R2+G3R1)/(G2R2-G3R1) < -0.1,$$

where G2R2 represents a radius of curvature of an image-side surface of the second lens, and G3R1 represents a radius of curvature of an object-side surface of the third lens.

14. The optical system according to claim 1, wherein:
the front lens unit includes a first lens subunit, which includes the first lens, disposed in an object side of the aperture stop,
the following inequality is satisfied:

$$0.1 < fGn1/f11 < 7.0,$$

where fGn1 represents a focal length of the first lens and f11 represents a focal length of the first lens subunit.

15. The optical system according to claim 1, wherein:
the front lens unit includes a second lens having a positive refractive power,
the following inequality is satisfied:

$$0.3 < vdn/vdp < 4.5,$$

wherein vdn represents an average value of Abbe number of the first lens and vdp represents an average value of Abbe number of the second lens.

16. The optical system according to claim 1, wherein the first lens is a meniscus lens having a convex surface on the object side.

17. The optical system according to claim 1, wherein:
the lens A is the positive lens and the lens B is the negative lens, and
the positive lens A is disposed in the object side of the negative lens B.

18. The optical system according to claim 17, wherein the negative lens B is a meniscus lens with a convex surface on the image side.

19. The optical system according to claim 1, wherein:
the lens C is the negative lens and the lens D is the positive lens, and
the negative lens C is disposed in the object side of the positive lens D.

20. The optical system according to claim 19, wherein the negative lens C is a biconcave lens.

21. The optical system according to claim 1, wherein the first cemented lens and the second cemented lens are disposed adjacent to each other with air interposed therebetween.

22. The optical system according to claim 1, wherein the front lens unit includes a first lens subunit consisting of three lenses, one of which is the first lens.

23. The optical system according to claim 1, wherein:
the front lens unit includes a first lens subunit consisting of, in order from the object side to the image side:
the first lens, which is a first negative meniscus lens having a convex surface on the object side;
a second negative meniscus lens having a convex surface on the object side; and
a positive lens.

24. An image pickup apparatus comprising:
an optical system comprising a plurality of lens units consisting of, in order from an object side to an image side:
a front lens unit having a positive refractive power; and
a rear lens unit including a final lens having a positive refractive power; and
an image pickup element configured to pick up an image formed by the optical system,
wherein the front lens unit includes, in order from the object side to the image side:
a first lens having a negative refractive power;
an aperture stop;
a first cemented lens consisting of a lens A and a lens B that are cemented together, one lens among the lenses A and B is a positive lens, and the other lens among the lenses A and B is a negative lens;
a second cemented lens consisting of a lens C and a lens D that are cemented together, one lens among the lenses C and D is a positive lens, and the other lens among the lenses C and D is a negative lens;
wherein the first lens is disposed at a most object side in the optical system and the final lens is disposed at a most image side in the optical system,
wherein the front lens unit is integrally moved toward the object side for focusing from an infinity to a closest object distance and the rear lens unit is not moved for focusing,
wherein the following inequality is satisfied:

$1.54 \leq (GLR1+GLR2)/(GLR1-GLR2) \leq 2.47$, where GLR1 represents a radius of curvature of an object-side surface of the final lens and GLR2 represents a radius of curvature on an image-side surface of the final lens.

* * * * *